July 18, 1950 J. S. COHEN 2,515,441

ANTENNA INPUT CIRCUITS

Filed June 25, 1947 2 Sheets-Sheet 1

Inventor:
Jeffrey S. Cohen
By Alden D. Redfield
Attorney

July 18, 1950 J. S. COHEN 2,515,441

ANTENNA INPUT CIRCUITS

Filed June 25, 1947 2 Sheets-Sheet 2

Inventor
Jeffrey S. Cohen
By Alden D. Redfield
Attorney

Patented July 18, 1950 2,515,441

UNITED STATES PATENT OFFICE 2,515,441

ANTENNA INPUT CIRCUITS

Jeffrey S. Cohen, Los Angeles, Calif., assignor to Avco Manufacturing Corporation, Cincinnati, Ohio, a corporation of Delaware Application June 25, 1947, Serial No. 756,992

1 Claim. (Cl. 250—20)

Figures 1, 2:
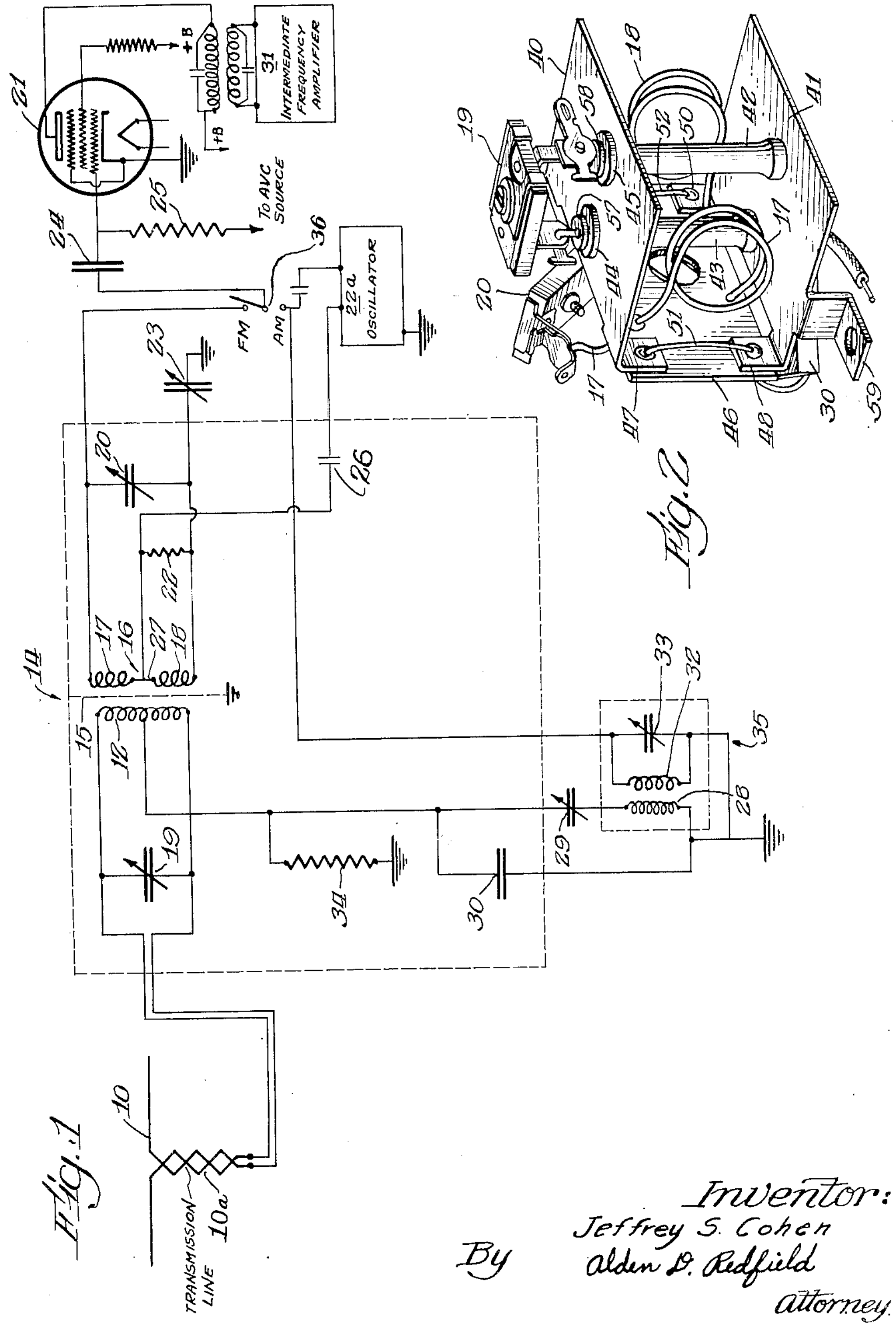
Figure 3:
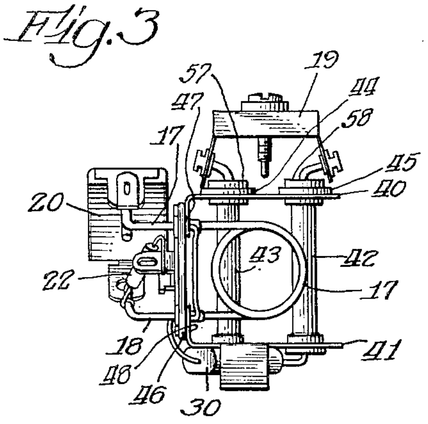
Figure 4:
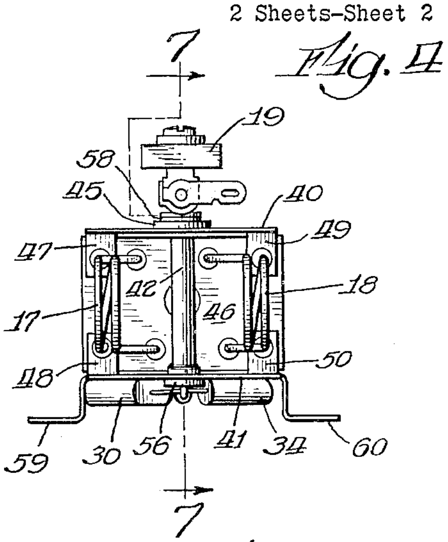
Figure 5:
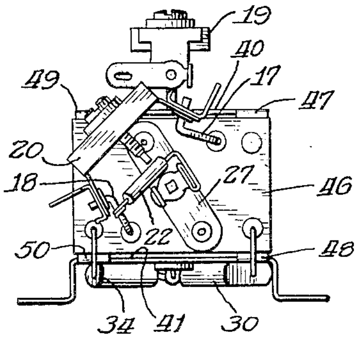
Figure 6:
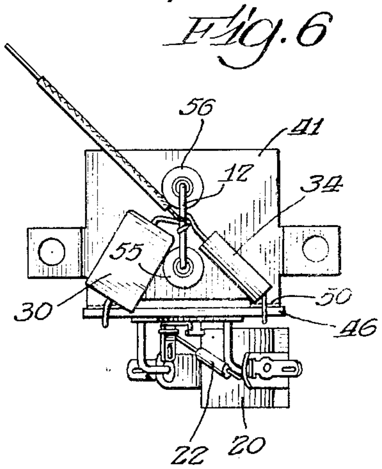

The present invention relates generally to electromagnetic wave-energy receivers, particularly to radio receiving systems and, while it has a considerable range of prospective commercial application, specifically to radio receivers of the type suitable for either frequency modulation (FM) or short wave (SW) signal reception.

In spite of the great progress made by the radio industry during the last half century and the many outstanding contributions to science made by research workers in this field, many problems have persistently sought solution. One problem which has troubled the industry for many years and stimulated the best efforts of radio research workers is the prevention of undesired signal radiation consequent upon the coupling of a local oscillator and an antenna circuit to a frequency conversion stage.

The most popular type of receiver is the superheterodyne and it poses a serious problem. It comprises an antenna-ground system for intercepting radio-frequency wave-energy, a variably tunable local oscillator for developing local signals, a frequency converter for utilizing the intercepted wave signals and the local signals to develop intermediate-frequency carrier signals, an intermediate-frequency amplifier for amplifying the last-named signals, a detector for deriving the intelligence from those signals, an audio-frequency amplifier for amplifying the detected signals and a transducer for converting the detected signals into sound. This type of receiver is very selective, efficient and therefore in popular demand, primarily because the intermediate-frequency amplifier can be "tailor made" always to effectively and faithfully amplify signals of the same intermediate frequency.

It is customary to amplify the received radio-frequency signals before they are applied to the frequency converter. One preselector or radio-frequency amplifier stage is usually employed for this purpose. However, a frequency converter can also be used as an amplifier and it is highly desirable to utilize that characteristic by coupling the antenna to the frequency converter. This step poses one problem solved by the present invention. The local oscillator is inherently a transmitter and it is always coupled to the frequency converter. Coupling the antenna to the converter in accordance with the prior art involved coupling the local oscillator to the antenna also. Then the receiver would function as a transmitter and there would be radiated out from the local oscillator undesired signals which impaired reception at other stations. With the advent of extremely high frequency reception, when the dimensions of the antenna became so small as to be comparable to the short wave lengths of such extremely high frequency signals, this problem became very serious. The smaller the antenna dimensions and the higher the frequency of the local oscillations, the more efficient becomes the antenna as a radiator of these undesired signals. So the prior art failed fully to utilize the above-mentioned amplification characteristic of the converter and interposed a radio-frequency amplifier between the antenna and the frequency converter, in order to uncouple or isolate the local oscillator from the antenna. Even this expedient did not successfully solve the problem because it did not prevent ground currents from by-passing the radio-frequency stage and proceeding from the local oscillator to the antenna.

Other disadvantages of the preselector stage were that it required tuning, increased production expense and costs to the consumer, and constituted a source of service troubles.

The disadvantages of the prior art practice are excessive costs and the introduction of switch contacts in the radio-frequency circuits. Such contacts seriously impair the performance of frequency modulation circuits and should be eliminated wherever possible.

Another problem raised by the prior art is that of discriminating against received signals of intermediate frequency before they reach the mixer or converter. It is customary to provide separate wave traps or the like for performing this function. It is desirable to utilize the existing short wave antenna input circuit elements to perform this task while the receiver is receiving frequency modulated waves. Such a step would save the cost of additional circuit elements and achieve maximum utilization of necessary existing circuit elements. In accordance with the invention shown in my copending divisional patent application, Serial No. 37,579, entitled "Antenna Input Circuits" and assigned to the same assignee as the present invention and application, there is provided an arrangement for accomplishing this objective.

It is accordingly a basic object of the invention to provide means here shown for purposes of illustration as a transformer including a primary coupled to the antenna and a balanced bridge-secondary having one arm coupled to the converter tube and both arms coupled to the primary in opposition to each other and a center tap connected to the oscillator for utilizing the amplification characteristic of the converter and coupling the antenna input directly to it, without permitting undesired radiation of the local oscillations.

Another basic object of the invention is to provide means for dispensing with the preselector or radio-frequency amplifier stage of a superheterodyne receiver and at the same time suppressing the application of local oscillator signals to the radiating system.

A further basic object of the invention is to provide novel balanced input transformer means intercoupling the antenna, converter and local oscillator in such a way as to voltage-amplify the received signals, to apply both received signals and local oscillations to the converter, and at the same time to nullify the effects of the local oscillations on the antenna.

A further object of the invention contemplates the providing of a simple, inexpensive balanced transformer structure for the purpose set forth.

For a better understanding of the present invention, together with other and further objects and capabilities thereof, reference is made to the accompanying drawings in which there is illustrated a signal translating system embodying a preferred illustrative form of the invention.

Figure 7:
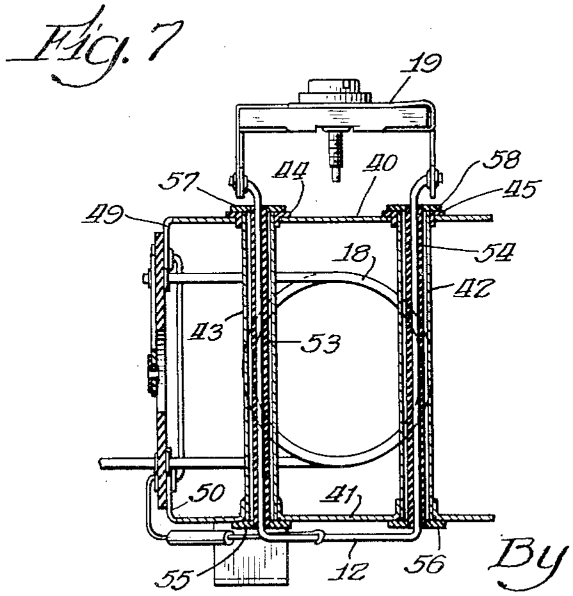

In the drawings:

Fig. 1 is a circuit diagram of a FM SW receiving system including a balanced FM input transformer and bridge network, a dual purpose antenna circuit and a combined FM IF rejector and SW input transformer circuit in accordance with the invention; Fig. 2 is a perspective view of a preferred form of balanced FM input transformer, serving also as a mounting for other circuit components hereinbelow described; Figs. 3, 4, 5 and 6 are, respectively right side, front, back and bottom views of the Fig. 2 transformer; and Fig. 7 is an elevational sectional view taken on line 7—7 of Fig. 4, looking in the direction of the arrows.

Referring now specifically to Fig. 1, there is illustrated a signal translating system including a balanced frequency-modulation signal input transformer and bridge network so arranged as to prevent radiation of undesired oscillator signals, a dual purpose antenna circuit, and a combined rejector and double tuned band pass antenna short wave signal input circuit, all in accordance with the invention. These features are shown as incorporated in a receiver adapted for frequency-modulation (FM) signal reception or short-wave (SW) broadcast signal reception.

For the interception of electromagnetic-wave energy there is provided an antenna 10, adapted to function as a dipole during reception of frequency-modulation (FM) signals. This antenna is connected by a pair of conductors to the terminals of the primary 12 of a balanced input transformer 14. This primary is a reactance or inductance in the form of a simple coupling loop. The primary and secondary are electrostatically shielded from each other by a grounded shield 15. According to one feature of the present invention and for a purpose hereinafter explained, the secondary 16 comprises two loop or inductance portions 17 and 18, conductively joined at a center tap 27.

Transformer 14 is over coupled so as to pass the entire 20 m. c. wide FM band.

The primary 12 is tuned to resonance at approximately the center frequency of the FM band, ninety-eight (98) megacycles, by a capacitor 19 shunted across the primary, and the secondary 16 is tuned to approximately the same frequency by a capacitor 20, shunted across the secondary.

The output from transformer 14 constitutes the received FM signal input applied to the control electrode circuit of a mixer or converter tube 21.

A conventional local oscillator 22*a* may be employed to generate high frequency signals which are also applied to an input circuit of the converter and therein beat against the received FM signal input to develop intermediate-frequency signals, in accordance with a heterodyne process well known in the art.

One important problem solved by the present invention is the prevention of the application, to the antenna, of signals from the local oscillator, while permitting both the received signal input and the local oscillator signals to be applied to the mixer stage without the intervention of a radio-frequency amplifier. It is well known to those skilled in the art that a local oscillator inherently functions as a transmitter. When the antenna input circuit and the oscillator output circuit are coupled to a common stage by prior art expedients, they are effectively coupled together, so that the antenna functions as a radiator of the electromagnetic wave energy developed by the local oscillator. Undesired signals are therefore radiated. These signals constitute a nuisance of a high order, interfering with regularly broadcast signals and impairing the enjoyment of reception by other members of the radio audience.

In successfully solving this problem, the circuit of secondary 16 is arranged as a balanced bridge, one branch of which comprises an inductive reactance or winding 17, capacitor 24 and the input impedance of vacuum tube 21, and the other branch of which comprises an inductive reactance or winding 18, and a resistor 22 and a capacitor 23, comprising a dummy load. Accordingly, capacitor 23 is placed in circuit between ground and the junction of capacitor 20 and winding 18. The cathode-control grid interelectrode capacitance of tube 21 and grid capacitor 24 are serially arranged in circuit between ground and the junction of capacitor 20 and winding 17. The dummy load resistor 22 is shunted across winding 18. Windings or reactances 17 and 18 are ratio arms of the bridge. The third arm is effectively the input impedance of tube 21. The fourth arm is effectively the dummy load. Grid resistor 25 is connected between a suitable source of automatic-volume control bias (not shown) and the junction of capacitor 24 and the grid. Primary 12 and secondary 16 are magnetically coupled but capacity coupling therebetween is prevented in this illustrative embodiment by the shield 15.

The signals from local oscillator 22*a* are applied through coupling capacitor 26 to the center tap 27 between windings 17 and 18 or some equivalent potential point, thus being impressed between center tap and ground. The local oscillator signals appearing in winding 17 are equal in magnitude and opposite in phase to those appearing in winding 18 and since oscillator signals in both windings 17 and 18 are applied in opposition to primary 12, no currents are induced in primary 12 by the local oscillator signals. Magnetic flux interlinkages tending to induce undesired voltages by secondary action on primary 12 are cancelled out. In other words, the coupling to the primary 12 is balanced out, so far as the oscillator is concerned, and radiation of the local oscillator signals from the antenna system is suppressed and prevented. This is accomplished by adjusting capacitor 23 for a voltage null across the antenna terminals, the oscillator voltages applied to ratio arms 17 and 18 then being equal and opposite in phase. Viewed in another way, the oscillator signals are 180 degree phase split and both portions are applied in opposition to primary 12.

A double-tuned band pass antenna input circuit for SW signals, novel in respects hereinafter pointed out, is provided. Specifically, a tuned primary circuit comprising winding 28 and capacitor 29 in one branch, and capacitor 30 in a parallel branch, is interposed between a center tap on primary 12 and ground. It will be noted that the output of the mixer stage including tube 21 is coupled to an intermediate frequency amplifier 31. The output signals of the mixer stage are of the intermediate frequency, say 10.7 megacycles, for FM operation.

It is well known to those skilled in the art that strong signals of intermediate frequency from undesired stations may be picked up by the transmission line 10*a* connecting the dipole antenna 10 to the input transformer 14. Interference of this type is reduced on the FM band by arranging the primary of the antenna input circuit so as to represent a low impedance for signals of intermediate frequency. The two sides of the transmission line 10*a* are effectively tied together at intermediate frequencies by coil 12 which represents a very low impedance at intermediate frequencies. Thus, in the Fig. 1 system, inductance 28 and capacitor 29 are in series resonance at the intermediate frequency for FM operation and attenuate intermediate frequency signals picked up on the transmission lines 10*a*.

The FM operation of the circuits just described is next considered. The balanced half-wave dipole 10 intercepts electromagnetic wave energy and delivers it to the balanced input transformer circuit 14.

The balanced, shielded, double-tuned band pass, FM input transformer 14 translate with gain the received signal voltage and rejects undesired signals outside the FM band. At the same time it prevents undesired radiation of the local oscillator signals. As noted above, were the last-mentioned signals not attenuated, as seen by the antenna, they would cause interference with other receivers in the vicinity. The mixer stage including tube 21 amplifies and converts the received FM signals to signals of intermediate frequency, say 10.7 megacycles.

The invention makes commercially practicable the entire omission of a radio-frequency amplifier stage and dispenses with the necessity of variably tuning the input circuit, with large resultant savings in costs to the consumer. Service troubles are also considerably reduced.

The IF signal output of tube 21 is applied to the intermediate frequency amplifier 31 in any conventional manner. It will be understood that the units (not shown) in cascade with and following unit 31 may constitute the usual remaining units of a superheterodyne FM receiver: one or more IF stages, a discriminator, an audio amplifier, a power amplifier, and a loud speaker or transducer.

Before considering the short wave (SW) operation of the Fig. 1 system, certain other circuit elements will be described. The SW double-tuned, high gain, band pass antenna input circuit transformer 35 comprises also a secondary 32, tuned by a capacitor 33 in shunt therewith. The primary 28 and condenser 29 act as a series-resonant rejector circuit for the FM IF frequency, as stated above (being tuned to 10.7 megacycles, approximately the middle of the band-spread SW band). The primary 28 and secondary 32 are inductively overcoupled and so arranged that the two spaced secondary response peaks occur at 31 and 25 meters, say. The band covers the 31 meter and 25 meter international SW broadcast stations.

Resistor 34, between winding 12 and ground, simply functions as a static leak to bleed off antenna charges to ground.

Coming now to the SW operation of the above-described system, it will be observed that the antenna terminal of the double tuned input transformer circuit including elements 28, 29 and 30 is connected to primary 12. The dipole 10 functions during SW operation as a T-type antenna, with both conductor portions in parallel, the impedance of primary 12 being low at that frequency range. The intercepted wave energy is applied to the primary of SW input transformer 35, and translated to the control electrode of tube 21.

For SW operation a single-pole double-throw switch 36 is so set as to couple the secondary circuit of transformer 35 to the input circuit of tube 21. For FM operation, the switch is so set that the secondary circuit of transformer 14 is coupled to the input circuit of tube 21. Oscillator 22 may have two ungrounded terminals, one for FM operation and the other for SW operation. During SW operation transformer 14 and the high frequency oscillator terminal of unit 22*a* are in open-circuit relation to tube 21 and the switch 36 couples the lower-frequency oscillator terminals to the input of tube 21.

In Figs. 2 to 7, inclusive, there is illustrated a form of transformer unit 14 which has been found eminently satisfactory from a practical commercial standpoint. The circuit components shown therein have the same reference numerals as those shown in Fig. 1. The unit comprises a pair of grounded non-magnetic metallic plates 40 and 41, held in fixed spaced relation by hollow non-magnetic metallic posts 42 and 43, secured to plate 41 as by soldering or brazing. To avoid closed eddy current paths and magnetic shielding effects the free ends of the posts are insulated from plate 40 as by grommets 44 and 45. The mounting assembly is completed by an insulating plate 46, to which spaced inturned lugs 47—50, integral with plates 40 and 41, are secured as by riveting. Conductive straps 51 and 52 connect lugs 47, 48, and 49, 50 respectively. Integral with plate 41 are mounting lugs 59 and 60.

The primary 12 is a U-shaped wire having legs projecting through insulating tubes 53 and 54, the tubes being concentrically disposed within posts 43 and 42, respectively. The central portion of the primary straddles a part of plate 41, the primary being insulated by washers 55—58. The primary leads are soldered to and support ceramic condenser 19.

The secondary comprises two loops 17 and 18, symmetrically mounted on each side of the posts, the common axis of the loops being perpendicular to the plane of the posts 42 and 43. The outer loop leads are brought out through insulating plate 46 and are soldered to and support ceramic condenser 20. The inner loop leads are brought out through posts in plate 46 to a conductive center strip 27. Mounted as by soldering between strip 27 and an outer lead of loop 18 is the dummy load resistor 22. Mounted as by soldering between the center of the primary and the rivet for lug 50 is the antenna static leak or resistor 34. Also mounted as by soldering between the center of the primary and the rivet for lug 48 is the capacitor 30 for the SW double tuned band-pass transformer circuit. Plates 40, 41, posts 42, 43 and straps 51 and 52 constitute a grounded shield 15.

It has been determined that, from a commercial and production standpoint, the above described transformer is simple, inexpensive, efficient and durable. Other transformers can, of course, be used in the Fig. 1 system. The one described has been found particularly effective.

The following illustrative circuit parameters have been found suitable in a successful embodiment of the invention:

| Element | Data |
|---|---|
| 19 | 8-95 mmf. |
| 20 | 2-12 mmf. |
| 34 | 1 megohm, ½ watt |
| 29 | 30-200 mmf. |
| 30 | 30 mmf., 500 volts, mica |
| 22 | 1000 ohms, ½ watt |
| 24 | 120 mmf., 300 volts, ceramic |
| 23 | 3-30 mmf. |
| 25 | 1 megohm, ½ watt |
| 21 | Type 6AC7 |
| FMIF | 10.7 megacycles |
| FM Band | 88-108 megacycles |
| SWIF | 5825 kilocycles from first converter |
| SW Band | 9.45 to 11.97 megacycles |
| Transformer 14 | Primary U-shaped piece #14 B & S gauge wire, ⅝" across U, 1⅛" between plates 40 and 41, diameter of secondary loops, ¾" diam; #14 B & S ga. each secondary loop spaced about ½" from either side of posts 42 and 43 and centered therewith. |
| Transformer 35 | Pu 19¾ T's #30<br>Sec. 27½ T's #30<br>Form diam.—½"<br>Winding pitch 56 T/in.<br>Spacing Pri./Sec.—1 turn<br>Sec. trimmer—1-6 mmfd. |

It is intended in the appended claims to obtain the advantages of the doctrine of equivalents. I claim:

In an electromagnetic wave receiver of the type comprising an input transformer having a primary and a center-tapped secondary, a mixer tube having a single anode and cathode and control electrode elements, said secondary being coupled to said cathode and control electrode, and an oscillator effectively coupled between said cathode and the tap on said secondary, whereby two paths are in parallel with said oscillator, one comprising one half of said secondary and the effective input impedance of said tube and including capacitance and resistance, and the other path comprising the remainder of said secondary, the improvement which resides in means for producing an oscillator voltage null across said secondary comprising a capacitor in series with said secondary and a resistor in parallel with said remainder of said secondary, said capacitor and resistor being in such other path and having such values as to equalize said paths.

JEFFREY S. COHEN.

REFERENCES CITED

The following references are of record in the file of this patent:

UNITED STATES PATENTS

| Number | Name | Date |
|---|---|---|
| 1,596,102 | Holden | Aug. 17, 1926 |
| 1,799,159 | Espenschied | Apr. 7, 1931 |
| 1,855,055 | Johnson | Apr. 19, 1932 |
| 1,980,158 | Hansell | Nov. 6, 1934 |
| 2,064,400 | Aceves | Dec. 15, 1936 |
| 2,074,896 | Earnshaw | Mar. 23, 1937 |
| 2,152,016 | Baesecke | Mar. 28, 1939 |
| 2,198,803 | Carlson | Apr. 30, 1940 |
| 2,242,791 | Ohl | May 20, 1941 |
| 2,260,844 | Thomas | Oct. 28, 1941 |
| 2,296,107 | Kimball | Sept. 15, 1942 |
| 2,309,031 | Worcester | Jan. 19, 1943 |
| 2,382,693 | Dallenbach | Aug. 14, 1945 |
| 2,441,452 | Strutt | May 11, 1948 |
| 2,453,078 | Posthumus | Nov. 2, 1948 |